(12) United States Patent
Shulman-Peleg et al.

(10) Patent No.: US 10,951,633 B1
(45) Date of Patent: Mar. 16, 2021

(54) SERVERLESS AUTO-REMEDIATING SECURITY SYSTEMS AND METHODS

(71) Applicant: CITIGROUP TECHNOLOGY, INC., Weehawken, NJ (US)

(72) Inventors: Alexandra Shulman-Peleg, Tenafly, NJ (US); Daniel Tylman, Modiin (IL)

(73) Assignee: CITIGROUP TECHNOLOGY, INC., Weehawken, NJ (US)

( * ) Notice: Subject to any disclaimer, the term of this patent is extended or adjusted under 35 U.S.C. 154(b) by 328 days.

(21) Appl. No.: 15/941,333

(22) Filed: Mar. 30, 2018

(51) Int. Cl.
*H04L 29/06* (2006.01)
*G06F 21/55* (2013.01)
*G06F 21/56* (2013.01)

(52) U.S. Cl.
CPC ........ *H04L 63/1416* (2013.01); *G06F 21/554* (2013.01); *G06F 21/566* (2013.01); *H04L 63/0227* (2013.01); *H04L 63/1441* (2013.01); *H04L 63/20* (2013.01)

(58) Field of Classification Search
CPC ............ H04L 63/1416; H04L 63/0227; H04L 63/1441; H04L 63/20; G06F 21/554; G06F 21/566
See application file for complete search history.

(56) References Cited

U.S. PATENT DOCUMENTS

| 10,284,660 | B1 * | 5/2019 | Nene ..................... H04L 41/083 |
| 2006/0282660 | A1 * | 12/2006 | Varghese .............. G07F 7/1041 713/155 |
| 2014/0325331 | A1 * | 10/2014 | Madireddi ............ G06F 40/174 715/224 |
| 2016/0103992 | A1 * | 4/2016 | Roundy ................ G06F 21/554 726/23 |
| 2016/0110542 | A1 * | 4/2016 | Shanbhogue ....... G06F 9/30054 726/23 |
| 2016/0180239 | A1 * | 6/2016 | Frankel .............. G06K 9/00771 706/12 |
| 2016/0182684 | A1 * | 6/2016 | Connor ............... G06F 9/45558 709/203 |
| 2017/0104916 | A1 * | 4/2017 | Mueller .................. H04L 67/10 |
| 2017/0357250 | A1 * | 12/2017 | Sandler ................. G06Q 10/00 |
| 2018/0113793 | A1 * | 4/2018 | Fink ..................... G06F 11/3624 |
| 2018/0115551 | A1 * | 4/2018 | Cole ................... H04L 41/0893 |
| 2018/0300173 | A1 * | 10/2018 | Shimamura ........... G06F 9/5027 |
| 2018/0302277 | A1 * | 10/2018 | Shimamura ......... H04L 41/5054 |
| 2019/0012218 | A1 * | 1/2019 | Rimac ..................... G06F 9/542 |

(Continued)

*Primary Examiner* — Sher A Khan
(74) *Attorney, Agent, or Firm* — Johnson, Marcou, Isaacs & Nix, LLC; George Marcou; Scott A. Hendrix (57) ABSTRACT

Systems and methods involve an input layer function of a function-as-a-service (FaaS) pipeline that receives trigger data from a trigger layer function of one or more processors of enterprise processing systems, calls one or more processors of an enrich layer function of the FaaS pipeline that adds enriching context to the trigger data, and creates an event based at least in part on the enriched trigger data. A route layer function of the FaaS pipeline invoked by the input layer function creates an action based on the event created by the input layer function. An action layer function of the FaaS pipeline invoked by the route layer function creates a command based on the action created by the route layer function, and the action layer function sends a remediation action to a command layer function of the enterprise processor based on the action created by the route layer function.

23 Claims, 4 Drawing Sheets

(56) References Cited

U.S. PATENT DOCUMENTS

| | | | |
|---|---|---|---|
| 2019/0036978 A1* | 1/2019 | Shulman-Peleg | G06F 21/554 |
| 2019/0108259 A1* | 4/2019 | Rabbah | G06F 9/5077 |
| 2019/0116124 A1* | 4/2019 | Pignataro | H04L 43/50 |
| 2019/0179684 A1* | 6/2019 | On | G06F 9/546 |
| 2020/0057676 A1* | 2/2020 | Vaikar | G06F 9/5027 |

* cited by examiner

SERVERLESS AUTO-REMEDIATING SECURITY SYSTEMS AND METHODS

FIELD OF THE INVENTION

The present invention relates generally to the field of security monitoring and remediation, and more particularly to systems and methods for automated security monitoring and remediation implemented with serverless architectures.

BACKGROUND OF THE INVENTION

Enterprises currently employ many different cyber security tools for searching and protecting against malware and suspicious activities. In large scale networks, such cyber security tools generate high volumes of security events, which are typically accompanied by audit logs. Such security events may then be triaged to determine their relevance, severity and possibly their remediation. Enterprises must thereby allocate resources to monitor and act on these security events.

Large enterprises often have multiple organizational layers, which require alerts to be redirected to different teams before security events can be triaged. In addition, such security events are often enriched with additional data from sources that may be outside or inside the enterprise, some of which data may be internal or confidential. Finally, when it is necessary to react to alerts, for example, with notifications, remediation actions, and/or reports, it may be necessary for different teams to refer to the same data from different perspectives, such as research and development perspectives, compliance perspectives, legal perspectives, and management perspectives.

As a result of the substantial complexity of the current process, automation of the process is extremely challenging, and there are no currently available products that facilitate such automation.

There is a present need for security monitoring systems and methods implemented with serverless architectures running, for example, over function-as-a-service solutions in which different layers of function-as-a-service components perform different functions with information being passed between such layers in a hierarchical architecture that overcome the deficiencies of legacy systems. The problem solved by embodiments of the invention is rooted in the technical limitations of the legacy approaches, and improved technology is needed to address the problems of existing approaches.

SUMMARY OF THE INVENTION

Embodiments of the invention advance technical fields for addressing problems associated with the above-described legacy manual processes as well as advancing peripheral technical fields. Such embodiments of the invention employ computer hardware and software, including, without limitation, one or more processors coupled to memory and non-transitory computer-readable storage media with one or more executable programs stored thereon which instruct the processors to perform the serverless auto-remediation described herein.

Embodiments of the invention are directed to technological solutions that may involve automated systems that may employ, for example, an input layer function of one or more processors of a function-as-a-service pipeline that receives trigger data from a trigger layer function of one or more processors of enterprise processing systems, calls on one or more processors of an enrich layer function of the one or more processors of the function-as-a-service pipeline, adds enriching context to the trigger data, and creates an event based at least in part on the enriched trigger data; a route layer function of the one or more processors of the function-as-a-service pipeline invoked by the input layer function of the one or more processors of the function-as-a-service pipeline that creates an action based at least in part on the event created by the input layer function of the one or more processors of the function-as-a-service pipeline; and an action layer function of the one or more processors of the function-as-a-service pipeline invoked by the route layer function of the one or more processors of the function-as-a-service pipeline that creates a command based at least in part on the action created by the route layer function of the one or more processors of the function-as-a-service pipeline.

In other aspects of embodiments of the invention, the trigger layer function of the one or more processors of the enterprise processing systems from which the input layer function of the one or more processors of the function-as-a-service pipeline receives trigger data may be, for example, an enterprise system processor. In still other aspects, the trigger layer function of the one or more processors of the enterprise processing systems from which the input layer function of the one or more processors of the function-as-a-service pipeline receives trigger data may include, for example, one or more enterprise software modules. In additional aspects, the trigger layer function of the one or more processors of the enterprise processing systems from which the input layer function of the one or more processors of the function-as-a-service pipeline receives trigger data may include, for example, one or more enterprise cyber security software modules. In other aspects, the one or more processors of the enterprise processing systems, the enterprise software modules, and the enterprise cyber security software modules may be located, for example, on a network comprising at least one of an isolated network, isolated computing software, and isolated computing hardware, and the input layer function of the function-as-a-service pipeline may be, for example, an only function-as-a-service layer located on external systems that can receive input from the one or more processors of the enterprise processing systems.

Further embodiments of the invention may include, for example, a command layer function of the one or more processors of the enterprise processing systems that executes the command created by the action layer function of the one or more processors of the function-as-a-service pipeline in real time. Additional aspects may include, for example, the input layer function of the one or more processors of the function-as-a-service pipeline that receives cyber security trigger data from the trigger layer function of the one or more processors of the enterprise processing systems, calls the enrich layer function of the one or more processors of the function-as-a-service pipeline that adds the enriching context to the trigger data, and creates a cyber security event based at least in part on the enriched trigger data. Other aspects may include, for example, the input layer function of the one or more processors of the function-as-a-service pipeline that receives cyber security trigger data from the trigger layer function of the enterprise processor dynamically in real time, calls the enrich layer function of the one or more processors of the function-as-a-service pipeline that adds the enriching context to the trigger data in real time, and creates the cyber security event based at least in part on the enriched trigger data in real time.

Additional aspects of embodiments of the invention may include, for example, the enrich layer function of the one or more processors of the function-as-a-service pipeline that adds the enriching context to the trigger data based at least in part on additional data from external data sources. Other aspects may include, for example, the enrich layer function of the one or more processors of the function-as-a-service pipeline that adds the enriching context to the trigger data based at least in part on filtering data from the input layer function of the one or more processors of the function-as-a-service pipeline. Additional aspects may include, for example, the input layer function of the one or more processors of the function-as-a-service pipeline that ignores data filtered from the additional data from the external sources by the enrich layer function of the one or more processors of the function-as-a-service pipeline. Still other aspects may include, for example, the route layer function of the one or more processors of the function-as-a-service that creates an action in real time for at least one of a legal function of the one or more processors of the enterprise processing systems, a security function of the one or more processors of the enterprise processing systems based at least in part on the event created by the input layer function of the one or more processors of the function-as-a-service pipeline.

Still further aspects of embodiments of the invention may include, for example, the route layer function of the one or more processors of the function-as-a-service pipeline that creates an action for a mailing list for the legal function of the one or more processors of the enterprise processing systems based at least in part on the event created by the input layer function of the one or more processors of the function-as-a-service pipeline. Additional aspects may include, for example, the route layer function of the one or more processors of the function-as-a-service pipeline that creates an action for security operations personnel for the security function of the one or more processors of the enterprise processing systems based at least in part on the event created by the input layer function of the one or more processors of the function-as-a-service pipeline. Other aspects may include, for example, the route layer function of the one or more processors of the function-as-a-service that creates an action for an access control device for the security function of the one or more processors of the enterprise processing systems based at least in part on the event created by the input layer function of the one or more processors of the function-as-a-service pipeline. Still other aspects of embodiments of the invention may include, for example, the action layer function of the one or more processors of the function-as-a-service pipeline invoked by the route layer function of the one or more processors of the function-as-a-service pipeline that sends a remediation action to a command layer function of the one or more processors of the enterprise processing systems based at least in part on the action created by the route layer function of the one or more processors of the function-as-a-service pipeline.

In additional aspects of embodiments of the invention, the action layer function of the one or more processors of the function-as-a-service pipeline may be, for example, an only function-as-a-service layer that can create commands for functions of the of one or more processors of the enterprise processing systems, and the functions of the of one or more processors of the enterprise processing systems may be located on a network that is at least one of dedicated and isolated and computing hardware. Other aspects may involve, for example, security systems that protect the function-as-a-service pipeline from code injections and data leakage. In still other aspects, the function-as-a-service pipeline may be, for example, integrated with authorization systems that control operations performed from each function-as-a-service layer.

Embodiments of the invention may also provide methods involving, for example, receiving, by an input layer function of one or more processors of a function-as-a-service pipeline, trigger data from a trigger layer function of an enterprise processor and calling, by the input layer function of the one or more processors of the function-as-a-service pipeline, an enrich layer function of the one or more processors of the function-as-a-service pipeline that adds enriching context to the trigger data; creating, by the input layer function of the one or more processors of the function-as-a-service pipeline, an event based at least in part on the enriched trigger data and invoking, by the input layer function of the one or more processors of the function-as-a-service pipeline, a route layer function of the one or more processors of the function-as-a-service pipeline; creating, by the route layer function of the one or more processors of the function-as-a-service pipeline, an action based at least in part on the event created by the input layer function of the one or more processors of the function-as-a-service pipeline and invoking, by the route layer function of the one or more processors of the function-as-a-service pipeline, an action layer function of the one or more processors of the function-as-a-service pipeline; and creating, by the action layer function of the one or more processors of the function-as-a-service pipeline, a command based at least in part on the action created by the route layer function of the one or more processors of the function-as-a-service pipeline.

In other aspects of the method for embodiments of the invention, calling the enrich layer function of the one or more processors of the function-as-a-service pipeline may involve, for example, calling, by the input layer function of the one or more processors of the function-as-a-service pipeline, the enrich layer function of the one or more processors of the function-as-a-service pipeline that adds enriching context to the trigger data based at least in part on filtering the data from external sources. In further aspects, calling the enrich layer function of the one or more processors of the function-as-a-service pipeline may involve, for example, calling, by the input layer function of the one or more processors of the function-as-a-service pipeline, the enrich layer function of the one or more processors of the function-as-a-service pipeline that adds enriching context to the trigger data based at least in part on filtering the data from external sources.

Further aspects of the method for embodiments of the invention may involve, for example, executing, by a command layer function of the one or more processors of the enterprise processor, the command created by the action layer function of the one or more processors of the function-as-a-service pipeline. Additional aspects may involve, for example, receiving, by the input layer function of the one or more processors of the function-as-a-service pipeline, cyber security trigger data from the trigger layer function of the enterprise processor dynamically in real time, calling, by the input layer function of the one or more processors of the function-as-a-service pipeline, the enrich layer function of the one or more processors of the function-as-a-service pipeline that adds enriching context to the trigger data in real time, and creating, by the input layer function of the one or more processors of the function-as-a-service pipeline, a cyber security event based at least in part on the enriched trigger data in real time.

In still further aspects of embodiments of the invention, creating the action by the route layer function of the one or more processors of the function-as-a-service pipeline may involve, for example, creating in real time, by the route layer function of the one or more processors of the function-as-a-service, an action for at least one of an enterprise processor legal function, an enterprise processor security function, and an enterprise processor operations function based at least in part on the event created by the input layer function of the one or more processors of the function-as-a-service pipeline. Additional aspects may involve, for example, sending in real time, by the action layer function of the one or more processors of the function-as-a-service pipeline invoked by the route layer function of the one or more processors of the function-as-a-service pipeline, a remediation action to a command layer function of the enterprise processor based at least in part on the action created by the route layer function of the one or more processors of the function-as-a-service pipeline.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

The emergence of platform-as-a-service introduced a new minimized effort ecosystem in which security-based business processing could be archived. Function-as-a-service (hereinafter referred to as "FaaS") is a mechanism recently offered by cloud platforms, which may be characterized as a category of cloud computing services that provides a platform allowing customers to develop, run, and manage application functionalities without the complexity of building and maintaining the infrastructure typically associated with developing and launching such an application.

FaaS is a concept of achieving serverless computing that may be characterized as a cloud computing execution model in which a cloud provider dynamically manages allocation of machine resources via a serverless architecture. Serverless computing may be employed as a powerful tool in embodiments of the invention to provide security architecture capabilities that achieve a better analysis of security events and enable action to be taken as a result of such an analysis.

In embodiments of the invention, software developers may leverage this aspect of FaaS, for example, to deploy an individual function, action, or piece of business logic. For example, FaaS infrastructure is agile and typically uses scripting languages such as Python or JavaScript. These scripting languages, especially when running on FaaS, separate the computing media from the algorithms and data structures. In embodiments of the invention, this aspect provides an ability to decouple between the infrastructure and business and enables developers to focus on business logic.

More importantly, however, when the framework for embodiments of the invention is installed, business logic may be developed and maintained by security personnel rather than software developers. This yields a novel script-based approach of maintaining security systems directly by security personnel and avoiding a need for software engineers, which in turn supports a "self-healing" approach described hereinafter, as users themselves configure and operate the system for embodiments of the invention. Thus, embodiments of the invention provide a framework, for example, that enables non-developers to maintain a security monitoring solution.

In FaaS, functions are expected to start within milliseconds and process individual requests, after which the process then ends. Significant aspects of FaaS may include, for example, complete abstraction of servers away from a developer; elimination of a need to build and compile software; services that are event-driven and instantaneously scalable; and billing based on consumption and execution that is independent of underlying physical or virtual resources and their attributes.

Embodiments of the invention provide a novel approach to leveraging the emerging FaaS architectures that improves enterprise security monitoring pipelines. In embodiments of the invention, the FaaS architecture eliminates a need to build and compile architectural software. The pipeline aspect for embodiments of the invention provides the logical infrastructure on top of the FaaS architecture for building a security monitoring solution for security teams.

The pipeline and layers for embodiment of the invention that are described herein detail a framework or security FaaS pipeline infrastructure based at least in part on aspects of the FaaS architecture that enable enterprises to create teams dedicated for security monitoring work and building, and maintaining their own security monitoring solution on FaaS. Thus, such layers for embodiments of the invention may be characterized as static components that define the framework whereas the scripts may be characterized as dynamic components maintained by security operations personnel.

Embodiments of the invention may provide, for example, a security system for enterprise security monitoring pipelines implemented with serverless architectures running over FaaS solutions. Thus, embodiments of the invention provide a serverless architecture that may involve different layers of FaaS components, with each layer performing a different function and information being passed between those layers in a hierarchical architecture. Such serverless architecture may involve a number of unique layers, such as real-world cyber security triggers, FaaS-based collectors and filters, FaaS-based enrichment functions, a FaaS-based routing layer, and a FaaS-based action layer.

In embodiments of the invention, real-world cyber security triggers may include, for example, multiple sets of software modules that may be attached to any non-FaaS hardware or software and which may be responsible for emitting security and enrichment events to the FaaS based collector layer. FaaS-based collectors and filters for embodiments of the invention may include, for example, functions that collect data from various sources implemented without dedicated physical or virtual servers. FaaS-based enrichment functions may include, for example, functions that are also implemented without dedicated physical or virtual servers that enrich the data collected with platform, application and service-specific context required for an understanding of the severity of an observed security event.

The FaaS-based routing layer for embodiments of the invention may include, for example, functions that are similarly implemented without dedicated physical or virtual servers and which make decisions regarding required actions. The FaaS-based action layer may include, for example, functions that are likewise implemented without dedicated physical or virtual servers and which generate actions that are required for specific security events. The real-world cyber action layer for embodiments of the invention may include, for example, multiple sets of software modules that may be attached to any non-FaaS hardware or software and may be capable of receiving and executing commands from the FaaS-based action layer. In embodiments of the invention, invocation of each FaaS layer may be accomplished in a unique way. Currently, monitoring of security is typically based on analysis of logs, which does not enable real time remediation actions. An aspect of embodiments of the invention may focus, for example, on treating and reacting to FaaS layers in real time.

Regarding security status-based FaaS invocation and resources consumption for embodiments of the invention, the number of spawned functions may depend, for example, on the number of security events/alerts, external context, and other factors. Further, for enterprise systems registration-based FaaS invocation and resources consumption, the number of FaaS invocations may depend, for example, on the status of enterprise control systems and their registration environments. In addition, in a hierarchical invocation of FaaS layers in embodiments of the invention, FaaS layer n may depend, for example, on an output and status of FaaS layer n−1. Thus, FaaS components may be triggered and depend upon each other in a hierarchy in which each layer may receive input from previous layers.

Regarding FaaS for big data analytics over enterprise systems in embodiments of the invention, FaaS may be invoked, for example, for big data analytics over data that may be dynamically pulled from static enterprise systems, such as legacy databases, catalogs, and control systems. Additionally, FaaS may be used, for example, to copy information from such legacy systems to cloud-based big data platforms, while performing data transformation to ensure security and privacy, for example, via anonymization, encryption and tokenization.

Significant aspects of the system for embodiments of the invention may include, for example, built-in function invocation tracking, built-in event correlation and topology control, and self-healing. In the built-in function invocation tracking aspect, as distinguished from traditional approaches of log-based monitoring, the FaaS system for embodiments of the invention may trace the dynamic execution by design. Specifically, in such aspect, there is no need to search logs for function invocations, as the system for embodiments of the invention dynamically acts upon security events as they occur.

In the built-in event correlation and topology control aspect for embodiments of the invention, unlike traditional approaches that require receiving data feeds from individual components and then correlating the results based on logs, the system for embodiments of the invention may automatically capture the correlations and flows without any need for additional event correlation technologies. For example, in embodiments of the invention, the dynamic environment variables uniquely describe the status of components, which allows follow-up action in real time.

In the self-healing aspect of embodiments of the invention, as systems become more dependent on cloud services, such as infrastructure platform (IaaS), container platform (CaaS), application platform (PaaS), function platform (FaaS) and software platform (SaaS), which all have service oriented architectures, strong and automated healing security actions may be implemented in embodiments of the invention. Thus, the action and command layers for embodiments of the invention described herein may act as an immune system, for example, by changing configurations and policies at runtime, revoking credentials, stopping containers, controlling devices, and notifying individuals, which may eventually result in follow-up changes in the real-world.

The self-healing architecture for embodiments of the invention may, for example, allow encoding security logic and actions of an enterprise into each and every piece of the distributed cloud platform, thus making the platform much more efficient than existing post processing and analysis systems of the enterprise. Such self-healing architecture may be analogized to molecular biology, where the FaaS system for embodiments of the invention may be analogous, for example, to antibodies of an immune system. For customers, the FaaS system may be managed and distributed to cloud components automatically in the same way as antibodies are produced by plasma cells, as distinguished from an analogy to traditional software architectures in which it would be necessary to deploy and control all the plasma cell with the antibodies. Once a violation is detected, the FaaS system for embodiments of the invention may neutralize the anomaly in a way that is analogous to antibodies neutralizing a pathogen.

The training and improvement of FaaS based self-healing systems for embodiments of the invention may also be done in a continuous way similarly, for example, to the way self-healing occurs in living systems. A first set of self-healing FaaS modules may be small and may be automatically augmented each time a new violation is detected and reported similarly, for example, to disease events in living systems that trigger generation of antibodies. The layers hierarchy for embodiments of the invention may provide a modular and distinctive design. For example, services and functions running in different layers may differ in the way they are managed, monitored and secured, as well as by a level of trust given to their outputs.

Layer identities and layer characteristics may be used to efficiently sample the FaaS hierarchy for embodiments of the invention to assess its status and security, as each layer may present certain attributes that are expected from that layer. Additional security systems, such as FaaS identity and authorization, prevention of FaaS-based injections, and FaaS monitoring, may be deployed to protect FaaS-based systems. In the FaaS identity aspect, each FaaS may have a unique identity that may be generated by supplementary systems based, for example, on FaaS, containers residing on virtual machines or dedicated hardware. Given FaaS identity, FaaS authorization may be managed locally or on external enterprise control systems.

Regarding the FaaS-based injections prevention aspect of embodiments of the invention, FaaS may be exploited to leak data in a way similar to the well-known structured query language (SQL) and non-structured query language (no-SQL) injections. In order to protect against FaaS-based injections, web application firewalls (WAF), data activity monitoring (DAM), and runtime application self-protection security (RASP) may be deployed between the FaaS system for embodiments of the invention and legacy data stores. As the number of FaaS instances may grow using traditional logging mechanisms, it may become difficult to ensure that proper FaaS are in place and that no malicious FaaS are injected. Thus, FaaS monitoring, such as uniform and stochastic sampling and query based techniques, may be employed to assess the status of FaaS.

Figure 1:
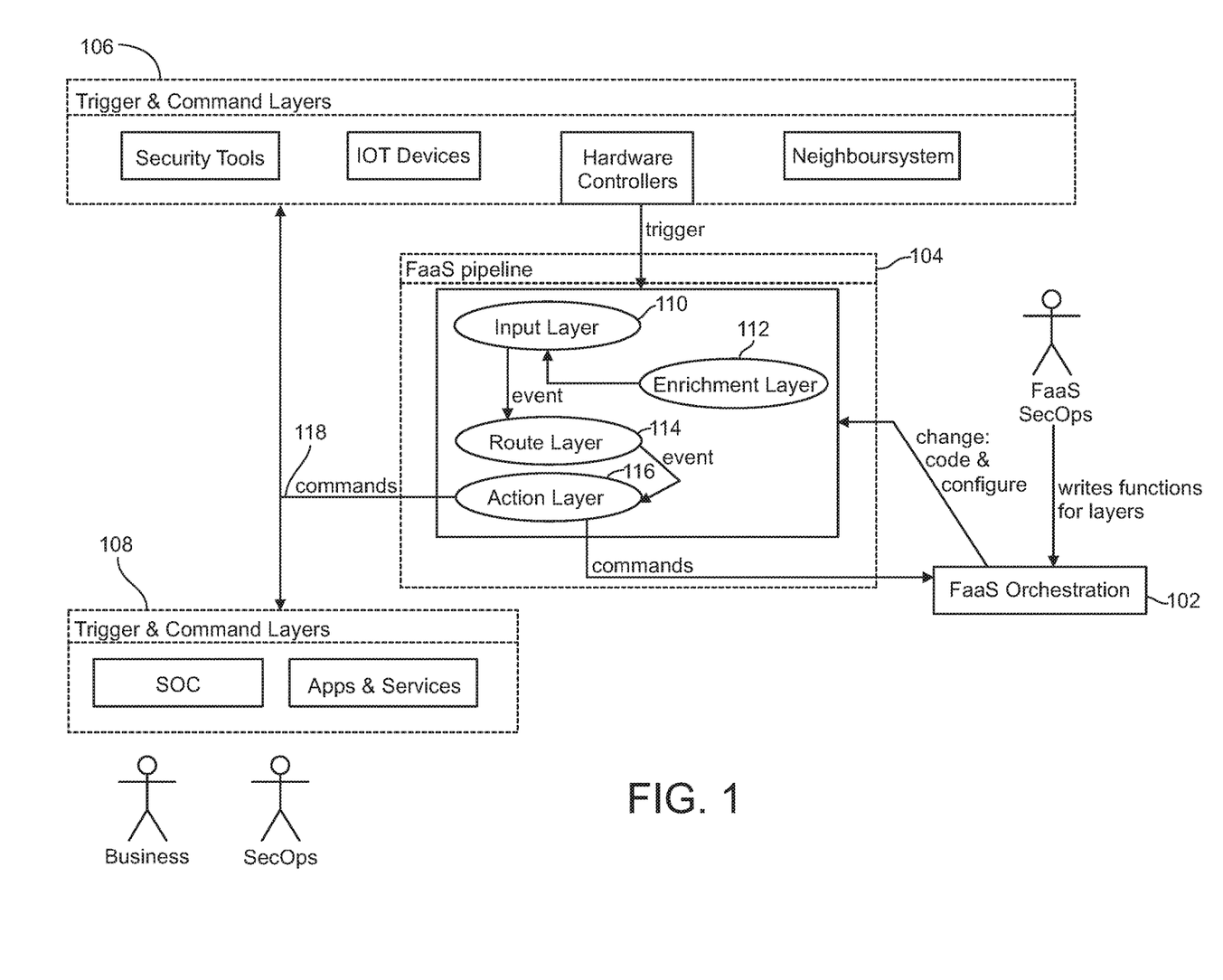
FIG. 1 is a schematic diagram that illustrates examples of service components and flow of information between service components for a function-as-a-service-based security monitoring system for embodiments of the invention.

FIG. 1 is a schematic diagram that illustrates examples of service components and flow of information between service components for a FaaS-based security monitoring system for embodiments of the invention. Referring to FIG. 1, such service components may include, for example, FaaS orchestration functions 102, FaaS pipeline functions 104, and triggers and commands layer functions 106, 108. The FaaS orchestration function 102 may comprise, for example, a software component that is responsible for deployment and monitoring of the security system for embodiments of the invention. In particular, the FaaS orchestration function 102 may, for example, enable viewing, editing and inserting a FAAS security layer in input layer functions 110, enrichment layer functions 112, route layer functions 114, and action layer functions 116 of the FaaS pipeline functions 104.

Additionally, in embodiments of the invention, the FaaS orchestration functions 102 may, for example, enable monitoring of a flow of events between the various services, as well as configuration, access control, policies, and the like. Referring again to FIG. 1, the FaaS pipeline functions 104 may comprise, for example, filter(s) layer FaaS functions, enricher(s) layer FaaS functions 112, router(s) layer FaaS functions 114, and actor(s) layer FaaS functions 116, which may implement a core functionality of the security monitoring system for embodiments of the invention. Each of such FaaS pipeline functions 104 may be, for example, a serverless, stateless, and event driven function, and each may perform a single task.

Referring further to FIG. 1, the enrichment layer FaaS functions 112 may work in conjunction with, or may be a part of, the input layer FaaS functions 110. It is possible that a basic flow between the input layer FaaS functions 110 and the enrichment layer FaaS functions 112 may be synchronous as opposed to the stateless and asynchronous characteristics of the rest of the system for embodiments of the invention. The enrichment layer FaaS functions 112 may be based, for example, on external services to provide computing and storage tools, such as document based databases and indexing, neuro-linguistic programming (NLP), image processing, geo-location, organizational charts, network traffic analysis, news providers, anomaly detectors, and the like.

Referring still further to FIG. 1, regarding trigger and command layers 106, 108, existing systems may provide input for security events and may also be leveraged to take actions when needed. A trigger may comprise, for example, any kind of data emitted from an existing system, such as a temperature reading from an IoT (Internet of Things) device, logs from a security information and event management (STEM) system, a network sniff from a device, an e-mail message, or a user click. The input layer FaaS functions 110 may be responsible, for example, for consuming and digesting such events, parsing the data, and putting the parsed data into context. The action layer FaaS functions 116 may be responsible, for example, for sending commands, at 118, to existing systems to make the required changes for remediation. It is to be understood that, if necessary, suitable adapter software may be employed to translate between certain protocols and devices.

Figure 2:
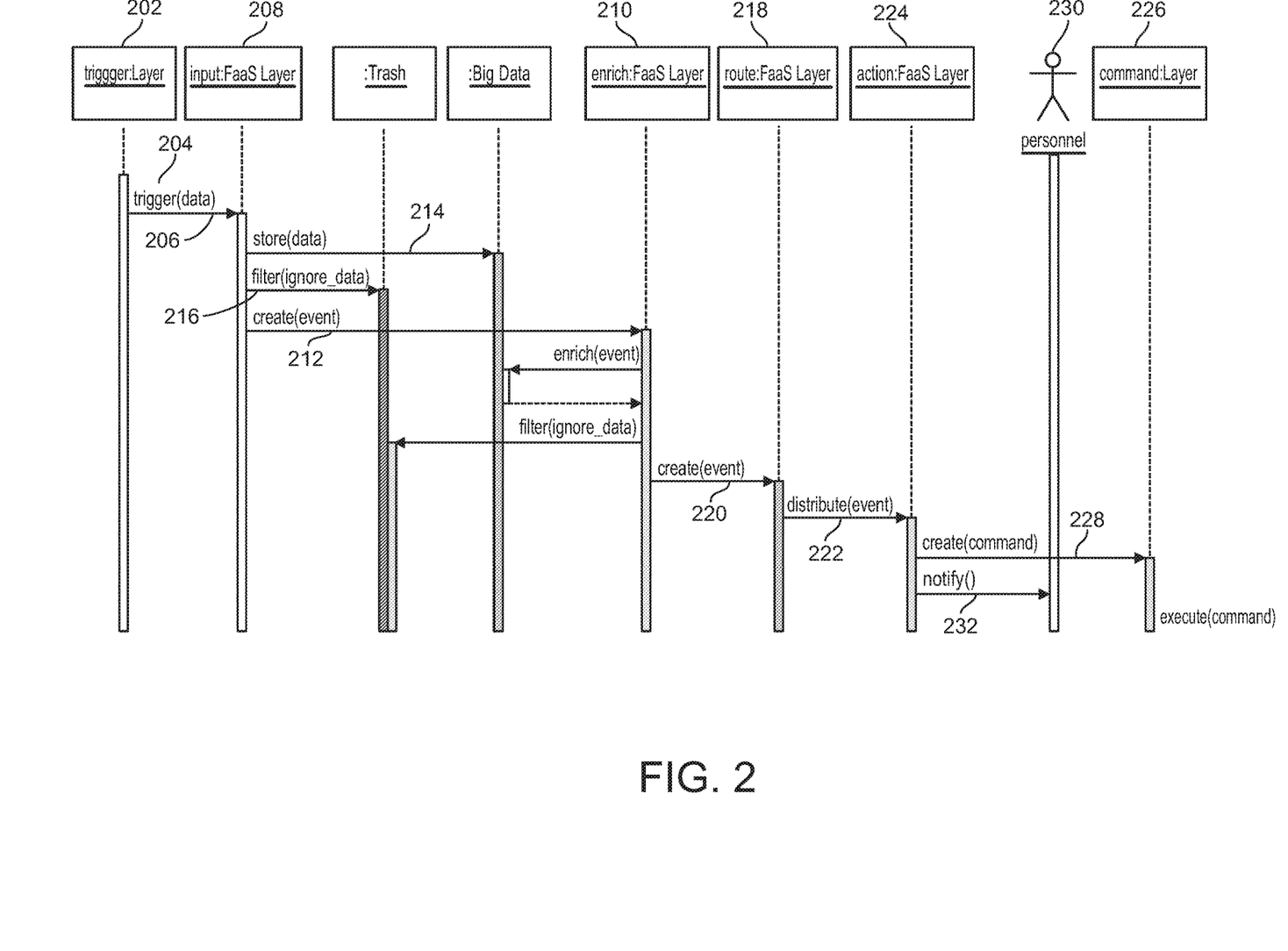
FIG. 2 is a use case diagram that illustrates an example of a flow of data between service functions provided in a function-as-a-service-based security monitoring system for embodiments of the invention.

FIG. 2 is a use case diagram that illustrates an example of a flow of data between service functions provided in a FaaS-based security monitoring system for embodiments of the invention. Referring to FIG. 2, the trigger layer functions 202 may comprise, for example, a set of software modules that generate status and security events, which may be referred to as trigger data 204. Such software modules may include, for example, multiple services on hardware devices (i.e. Internet of Things or IoT), dedicated software (i.e., SIEM systems), or any other suitable hardware, software or services.

Referring further to FIG. 2, at 206, the collected trigger data 204 may be sent by the trigger layer functions 202 to input layer FaaS functions 208, which may consume the triggered events. The input layer FaaS functions 208 may work, for example, in conjunction with the enrich layer FaaS functions 210. For example, at 212, the input layer FaaS functions 208 may, for example, call the enrich layer FaaS functions 210 to add context to the trigger data 204, thus creating an event. In addition, at 214, the input layer FaaS functions 208 may, for example, persist data and events for future analysis and forensics, filter out non-relevant data at 216, and invoke route layer FaaS functions 218 by creating routing events at 220.

Referring again to FIG. 2, the route layer FaaS functions 218 may, for example, create actions at 222 on the action layer FaaS functions 224, depending on the consumed event type and data. The action layer FaaS functions 224 and command layer modules 226 may be responsible, for example, for creating remediation actions at 228 as a response to a consumed event. Such remediation actions may include, for example, notifying personnel 230 at 232 using a notification service, performing a configuration change on FaaS, IaaS, PaaS or any other infrastructure, or sending a command to a supervisory control and data acquisition (SCADA) or IoT device, such as a command for locking a door or starting an air conditioning system.

Figure 3:
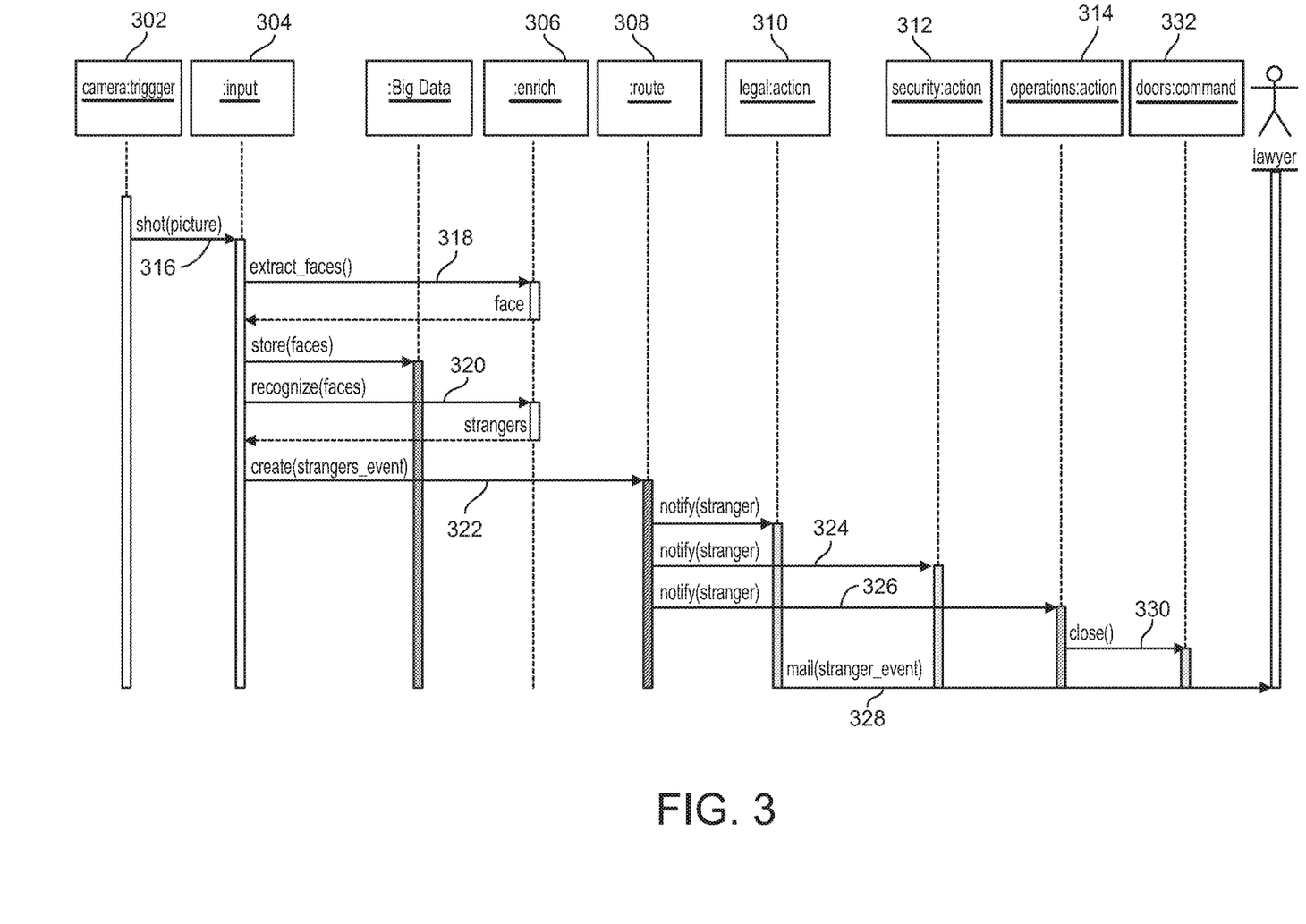
FIG. 3 is a use case diagram that illustrates a hypothetical example of implementation of a function-as-a-service-based security monitoring system for embodiments of the invention.

FIG. 3 is a use case diagram that illustrates a hypothetical example of implementation of a FaaS-based security monitoring system for embodiments of the invention. The diagram of FIG. 3 illustrates an example of a process in which the FaaS security pipeline for embodiments of the invention may be employed to detect and handle a simple matter, such as an unauthorized person entering a secured facility. Referring to FIG. 3, component functions of the FaaS-based security monitoring system for embodiments of the invention may include, for example, the trigger layer functions 302, such as one or more cameras, the input layer FaaS functions 304, the enrich layer FaaS functions 306, route layer FaaS functions 308, and the action layer FaaS functions 310, 312, and 314.

As noted, in embodiments of the invention, the trigger layer functions 302 may comprise, for example, one or more surveillance cameras stationed in key areas, which may periodically take pictures of their surroundings. Referring further to FIG. 3, at 316, such pictures may be uploaded from a camera of the trigger layer functions 302 to the input layer FaaS functions 304. Regarding the input layer FaaS functions 304 and the enrich layer FaaS functions 306, the input data in the form of such pictures may be consumed, for example, by the input layer FaaS functions 304 calling a face detection algorithm function at 318 to detect faces in the pictures. Thereafter, at 320, faces in the pictures may be compared with a database storing data regarding faces of authorized personnel. For each unauthorized face that is detected, at 322, an event may be created to the route layer FaaS functions 308 for notification regarding a stranger.

Referring again to FIG. 3, at 324, 326, route layer FaaS functions 308 may be triggered to create events for the required actions to legal 310, security 312, and operations 314 functions. At 324, the route function 310 may, for example, may send notification regarding a stranger to the legal action function 310. At 326, the security action function 312 may, for example, notify personnel of the security operations function 314 to check whether the authorized personnel database should be updated. At 328, the legal action function 310 may, for example, send mail to a lawyer's mailing list. At 330, the operations action function 314 may, for example, notify a command function 332, such as an IOT device of the door through which access was attempted to close or verify the door is closed.

Figure 4:
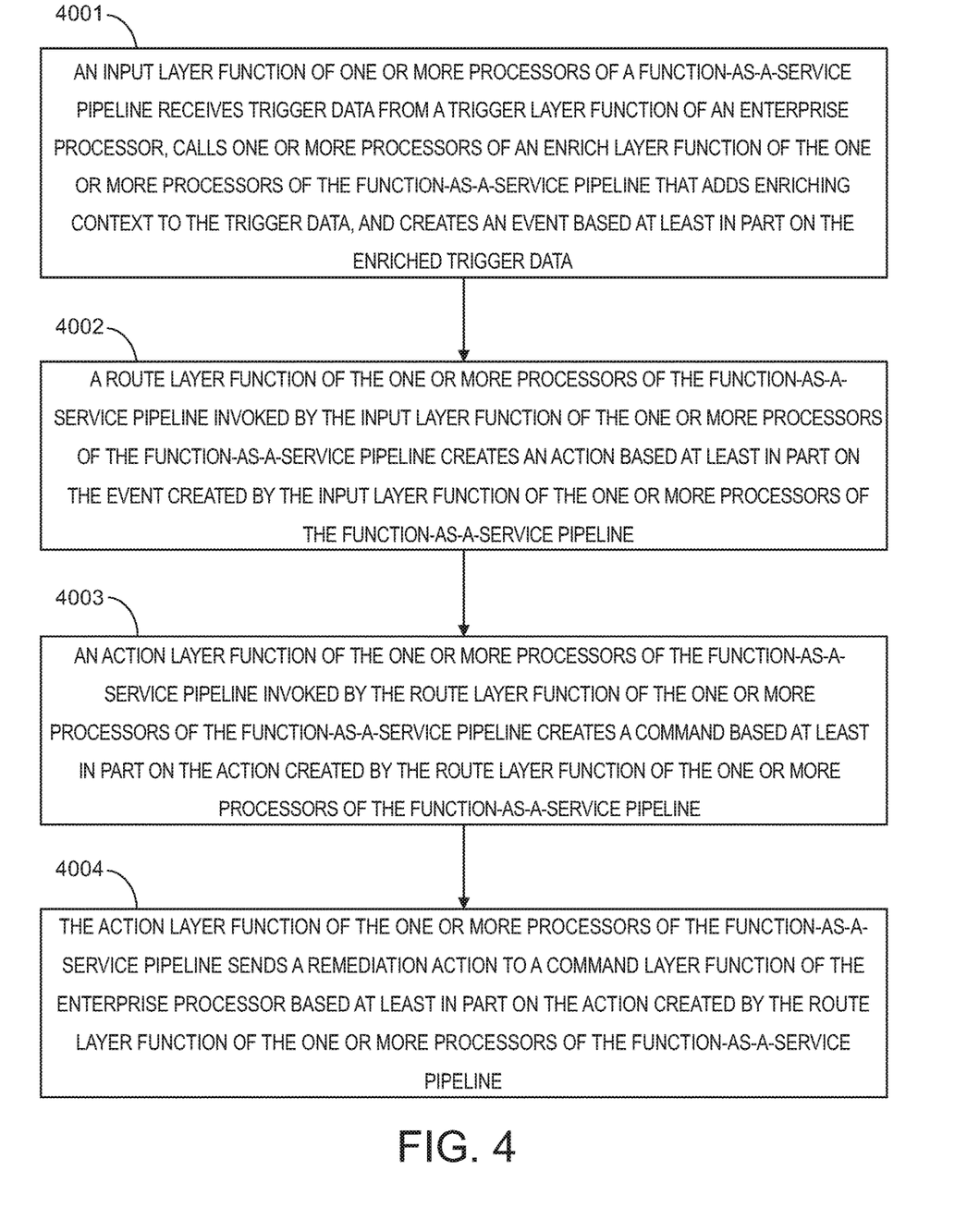
FIG. 4 is a flow chart that illustrates an example of a process of a function-as-a-service-based serverless auto-remediation of security issues for embodiments of the invention.

FIG. 4 is a flow chart that illustrates an example of a process of FaaS-based serverless auto-remediation of security issues for embodiments of the invention. Referring to FIG. 4, at 4001, an input layer function of one or more processors of a function-as-a-service pipeline may, for example, receive trigger data from a trigger layer function of an enterprise processor, call one or more processors of an enrich layer function of the one or more processors of the function-as-a-service pipeline that adds enriching context to the trigger data, and create an event based at least in part on the enriched trigger data. At 4002, a route layer function of the one or more processors of the function-as-a-service pipeline invoked by the input layer function of the one or more processors of the function-as-a-service pipeline may, for example, create an action based at least in part on the event created by the input layer function of the one or more processors of the function-as-a-service pipeline. At 4003, an action layer function of the one or more processors of the function-as-a-service pipeline invoked by the route layer function of the one or more processors of the function-as-a-service pipeline may, for example, create a command based at least in part on the action created by the route layer function of the one or more processors of function-as-a-service pipeline. At 4004, the action layer function of the one or more processors of the function-as-a-service pipeline may, for example, send a remediation action to a command layer function of the enterprise processor based at least in part on the action created by the route layer function of the one or more processors of the function-as-a-service pipeline.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The present invention may be a system, a method, and/or a computer program product at any possible technical detail level of integration. The computer program product may include a computer readable storage medium (or media) having computer readable program instructions thereon for causing a processor to carry out aspects of the present invention.

It is to be understood that embodiments of the invention may be implemented as processes of a computer program product, each process of which is operable on one or more processors either alone on a single physical platform or across a plurality of platforms, such as a system or network, including networks such as the Internet, an intranet, a WAN, a LAN, a cellular network, or any other suitable network.

Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

Aspects of the present invention may be described herein with reference to flowchart illustrations and/or block diagrams of methods, apparatus (systems), and computer program products according to embodiments of the invention. It will be understood that each block of such flowchart illustrations and/or block diagrams, and combinations of blocks in the flowchart illustrations and/or block diagrams, may be implemented by computer readable program instructions. These computer readable program instructions may be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures may illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
one or more processors of a function-as-a-service pipeline, the one or more hardware processors being coupled to non-transitory computer-readable mediums and comprising:
an input layer function that:
receives trigger data from a trigger layer function of one or more processors of an enterprise processing systems in real time at the time of an event;
calls one or more processors of an enrich layer function of the one or more processors of the function-as-a-service pipeline in real time, wherein the enrich layer function adds enriching context from an external source to the trigger data in real time; and
creates an event based at least in part on the enriched trigger data in real time;

a route layer function of the one or more processors of the function-as-a-service pipeline invoked by the input layer function of the one or more processors of the function-as-a-service pipeline, wherein the route layer function creates an action in real time based at least in part on the event created by the input layer function of the one or more processors of the function-as-a-service pipeline; and
an action layer function of the one or more processors of the function-as-a-service pipeline invoked by the route layer function of the one or more processors of the function-as-a-service pipeline, wherein the action layer function creates a command in real time based at least in part on the action created by the route layer function of the one or more processors of the function-as-a-service pipeline.

2. The system of claim 1, wherein the trigger layer function of the one or more processors of the enterprise processing systems from which the input layer function of the one or more processors of the function-as-a-service pipeline receives trigger data comprises an enterprise system processor.

3. The system of claim 2, wherein the trigger layer function of the one or more processors of the enterprise processing systems from which the input layer function of the one or more processors of the function-as-a-service pipeline receives trigger data further comprises one or more enterprise software modules.

4. The system of claim 3, wherein the trigger layer function of the one or more processors of the enterprise processing systems from which the input layer function of the one or more processors of the function-as-a-service pipeline receives trigger data comprises one or more enterprise cyber security software modules.

5. The system of claim 4, wherein the one or more processors of the enterprise processing systems, the enterprise software modules, and the enterprise cyber security software modules are located on a network comprising at least one of an isolated network, isolated computing software, and isolated computing hardware, and wherein the input layer function of the function-as-a-service pipeline is an only function-as-a-service layer located on external systems that can receive input from the one or more processors of the enterprise processing systems.

6. The system of claim 1, further comprising a command layer function of the one or more processors of the enterprise processing systems that executes the command created by the action layer function of the one or more processors of the function-as-a-service pipeline in real time.

7. The system of claim 1, wherein the input layer function of the one or more processors of the function-as-a-service pipeline further comprises the input layer function of the one or more processors of the function-as-a-service pipeline that receives cyber security trigger data from the trigger layer function of the one or more processors of the enterprise processing systems, calls the enrich layer function of the one or more processors of the function-as-a-service pipeline that adds the enriching context to the trigger data, and creates a cyber security event based at least in part on the enriched trigger data.

8. The system of claim 1, wherein the enrich layer function of the one or more processors of the function-as-a-service pipeline further comprises the enrich layer function of the one or more processors of the function-as-a-service pipeline that adds the enriching context to the trigger data based at least in part on additional data from external data sources.

9. The system of claim 8, wherein the enrich layer function of the one or more processors of the function-as-a-service pipeline further comprises the enrich layer function of the one or more processors of the function-as-a-service pipeline that adds the enriching context to the trigger data based at least in part on filtering data from the additional data from external sources.

10. The system of claim 9, wherein the input layer function of the one or more processors of the function-as-a-service pipeline further comprises the input layer function of the one or more processors of the function-as-a-service pipeline that ignores data filtered from the additional data from the external sources by the enrich layer function of the one or more processors of the function-as-a-service pipeline.

11. The system of claim 1, wherein the route layer function of the one or more processors of the function-as-a-service pipeline further comprises the route layer function of the one or more processors of the function-as-a-service that creates an action in real time that is performed by at least one of a legal function of the one or more processors of the enterprise processing systems, a security function of the one or more processors of the enterprise processing systems based at least in part on the event created by the input layer function of the one or more processors of the function-as-a-service pipeline.

12. The system of claim 11, wherein the route layer function of the one or more processors of the function-as-a-service pipeline further comprises the route layer function of the one or more processors of the function-as-a-service that creates an action that is performed on a mailing list that is operated by the legal function of the one or more processors of the enterprise processing systems based at least in part on the event created by the input layer function of the one or more processors of the function-as-a-service pipeline.

13. The system of claim 11, wherein the route layer function of the one or more processors of the function-as-a-service pipeline further comprises the route layer function of the one or more processors of the function-as-a-service pipeline that creates an action that is performed by security operations personnel to service the security function of the one or more processors of the enterprise processing systems based at least in part on the event created by the input layer function of the one or more processors of the function-as-a-service pipeline.

14. The system of claim 11, wherein the route layer function of the one or more processors of the function-as-a-service pipeline further comprises the route layer function of the one or more processors of the function-as-a-service that creates an action to be performed by an access control device to service the security function of the one or more processors of the enterprise processing systems based at least in part on the event created by the input layer function of the one or more processors of the function-as-a-service pipeline.

15. The system of claim 1, wherein the action layer function of the one or more processors of the function-as-a-service pipeline further comprises the action function of the one or more processors of the function-as-a-service pipeline invoked by the route layer function of the one or more processors of the function-as-a-service pipeline that sends a remediation action to a command layer function of the one or more processors of the enterprise processing systems based at least in part on the action created by the route layer function of the one or more processors of the function-as-a-service pipeline.

16. A method comprising:
receiving, by an input layer function of one or more processors of a function-as-a-service pipeline, trigger data from a trigger layer function of an enterprise processor in real time at the time of an event;
calling, by the input layer function of the one or more processors of the function-as-a-service pipeline, an enrich layer function of the one or more processors of the function-as-a-service pipeline, wherein the enrich layer function adds enriching context to the trigger data in real time;
creating, by the input layer function of the one or more processors of the function-as-a-service pipeline, an event in real time based at least in part on the enriched trigger data and invoking, by the input layer function of the one or more processors of the function-as-a-service pipeline, a route layer function of the one or more processors of the function-as-a-service pipeline;
creating, by the route layer function of the one or more processors of the function-as-a-service pipeline, an action in real time based at least in part on the event created by the input layer function of the one or more processors of the function-as-a-service pipeline and invoking, by the route layer function of the one or more processors of the function-as-a-service pipeline, an action layer function of the one or more processors of the function-as-a-service pipeline; and
creating, by the action layer function of the one or more processors of the function-as-a-service pipeline, a command in real time based at least in part on the action created by the route layer function of the one or more processors of the function-as-a-service pipeline.

17. The method of claim 16, wherein calling the enrich layer function of the one or more processors of the function-as-a-service pipeline further comprises calling, by the input layer function of the one or more processors of the function-as-a-service pipeline, the enrich layer function of the one or more processors of the function-as-a-service pipeline that adds enriching context to the trigger data based at least in part on filtering the data from external sources.

18. The method of claim 16, further comprising executing, by a command layer function of the one or more processors of the enterprise processor, the command created by the action layer function of the one or more processors of the function-as-a-service pipeline.

19. The method of claim 16, wherein creating the action by the route layer function of the one or more processors of the function-as-a-service pipeline further comprises creating in real time, by the route layer function of the one or more processors of the function-as-a-service, an action that is performed by at least one of an enterprise processor legal function, an enterprise processor security function, and an enterprise processor operations function based at least in part on the event created by the input layer function of the one or more processors of the function-as-a-service pipeline.

20. The method of claim 16, further comprising sending in real time, by the action layer function of the one or more processors of the function-as-a-service pipeline invoked by the route layer function of the one or more processors of the function-as-a-service pipeline, a remediation action to a command layer function of the enterprise processor based at least in part on the action created by the route layer function of the one or more processors of the function-as-a-service pipeline.

21. The system of claim 1, wherein the action layer function of the one or more processors of the function-as-a-service pipeline is an only function-as-a-service layer that can create commands to be performed by functions of the of one or more processors of the enterprise processing systems, said functions of the of one or more processors of the enterprise processing systems being located on a network that is at least one of dedicated and isolated and computing hardware.

22. The system of claim 1, further comprising security systems that protect the function-as-a-service pipeline from code injections and data leakage.

23. The system of claim 1, wherein the function-as-a-service pipeline is integrated with authorization systems that control operations performed from each function-as-a-service layer.

* * * * *